United States Patent
Cheng

(10) Patent No.: US 7,313,392 B2
(45) Date of Patent: Dec. 25, 2007

(54) MOBILE STATION APPARATUS CAPABLE OF DISPLAYING BETTER COMMUNICATION LOCATIONS FOR POWER SAVING AND METHOD OF THE SAME

(75) Inventor: Steven D. Cheng, San Diego, CA (US)

(73) Assignee: BENQ Corporation, Taoyuan (TW)

( * ) Notice: Subject to any disclaimer, the term of this patent is extended or adjusted under 35 U.S.C. 154(b) by 581 days.

(21) Appl. No.: 10/893,751

(22) Filed: Jul. 16, 2004

(65) Prior Publication Data
US 2006/0030270 A1    Feb. 9, 2006

(51) Int. Cl.
H04M 1/663  (2006.01)
H04Q 7/20   (2006.01)
H04B 3/46   (2006.01)

(52) U.S. Cl. .................. 455/423; 455/414.2; 455/425; 455/67.11; 375/227

(58) Field of Classification Search ............. 455/414.2, 455/423, 425, 456.1, 67.11, 436, 437, 440; 375/227, 228
See application file for complete search history.

(56) References Cited

U.S. PATENT DOCUMENTS 6,006,089 A * 12/1999 Sasaki et al. ............... 455/423
6,397,090 B1   5/2002 Cho ............................ 455/574
7,062,296 B2 * 6/2006 Brennan et al. .......... 455/562.1
2004/0072577 A1 * 4/2004 Myllymaki et al. ...... 455/456.1
2005/0185615 A1 * 8/2005 Zegelin ...................... 370/331

FOREIGN PATENT DOCUMENTS

CN    1168473 A    12/1997
CN    1249644 A     4/2000

* cited by examiner

Primary Examiner—Matthew Anderson
Assistant Examiner—Yuwen Pan
(74) Attorney, Agent, or Firm—Birch, Stewart, Kolasch & Birch, LLP

(57) ABSTRACT

The present invention provides a mobile station apparatus. The mobile station apparatus comprises an RF transmitting/receiving module, a display module, a memory comprising an RSSI database, and a control program. When the mobile station apparatus moves along a path comprising plural candidates of communication locations, the control program records a plurality of RSSIs, which are received by the RF transmitting/receiving module from the candidates along the communication locations, and at least one path parameter in the RSSI database, and then according to a predetermined display algorithm, the control program controls the display module to display at least one recorded RSSI and the corresponding path parameter as a reference, based on which the mobile station apparatus selects a communication location candidate for providing the mobile communication service.

22 Claims, 4 Drawing Sheets

MOBILE STATION APPARATUS CAPABLE OF DISPLAYING BETTER COMMUNICATION LOCATIONS FOR POWER SAVING AND METHOD OF THE SAME

BACKGROUND OF THE INVENTION

1. Field of the Invention

The present invention relates to a mobile station apparatus, especially to a mobile station apparatus capable of displaying better communication locations as a reference for power saving.

2. Description of the Prior Art

A mobile station apparatus, such as a mobile phone, provides convenience for mobile communication of a user. However, the quality of communication is affected at some locations with bad signal transmission, and the user has to seek around for better communication locations. In general, the user can find better communication locations according to the clarity of the audio signal while communicating with someone, so the user has to move around while communicating with the person and also worries about whether communication will be broken off anytime. Moreover, the mobile station apparatus of the prior art displays a grid pattern thereon for substantially representing the intensity of signal, based on which the user can judge whether the quality of communication is better at a current location. If the mobile station apparatus only displays a few or even no grid patterns, the user has to move somewhere else for seeking a better communication location. Furthermore, the user still cannot be sure to find the appropriate location accurately according to these grid patterns. Because the mobile station apparatus of the prior art doesn't provide data about better communication locations for reference, the user may only find better communication locations by moving everywhere.

When the user conducts mobile communication at a location with bad signal transmission, the power consumption of the mobile station apparatus is higher, and the battery of the mobile station apparatus is limited. Before the user conducts a mobile communication, especially when the electricity of the battery in the mobile station apparatus is limited, if the user can select a better communication location first, the power consumption of the mobile station apparatus will be lowered, so as to save electric power in the battery.

Therefore, the objective of the present invention is to provide to a mobile station apparatus capable of displaying better communication locations for power saving and method thereof, so as to save electric power in the battery.

SUMMARY OF THE INVENTION

The objective of the present invention is to provide a mobile station apparatus for selecting communication locations therein and the method thereof, especially to provide communication location candidates as reference data for selection.

The other objective of the present invention is to provide a mobile station apparatus for selecting communication locations therein and the method thereof, especially to provide communication location candidates as reference data for selection, so that a user can select a communication location candidate for conducting mobile communication service which provides better communication quality; the mobile station apparatus may also save electric power in the battery.

A mobile station apparatus of the present invention is used in a communication system. The communication system comprises a plurality of base stations for providing mobile communication service within a covered communication area. The mobile station apparatus comprises an RF transmitting/receiving module, a display module, a memory, and a control program.

The RF transmitting/receiving module is used for transmitting and receiving RF signals to/from the base stations and for receiving a received signal strength indicator (RSSI) from the base stations. The display module is used for displaying characters or graphs thereon. The memory comprises an RSSI database.

When the mobile station apparatus moves along a path comprising plural candidates of communication locations, the control program records a plurality of RSSIs, which are received by the RF transmitting/receiving module from the candidates along the communication locations, and at least one path parameter in the RSSI database. Then, according to a predetermined display algorithm, the control program controls the display module to display at least one recorded RSSI and the corresponding path parameter as a reference, based on which the mobile station apparatus selects a communication location candidate for providing the mobile communication service.

Because the mobile station apparatus of the present invention can display the RSSI and the corresponding path parameter as a reference, the mobile station apparatus can select a communication location candidate for providing mobile communication service based on the reference. Selecting better locations for conducting mobile communication service not only improves communication quality but also reduces power consumption of the mobile station apparatus, thus saving electric power in the battery.

The advantage and spirit of the invention may be understood by the following recitations together with the appended drawings.

BRIEF DESCRIPTION OF THE APPENDED DRAWINGS

DETAILED DESCRIPTION OF THE INVENTION

The present invention provides a mobile station apparatus in a communication system. The communication system comprises a plurality of base stations for providing mobile communication service within a covered communication area. The present invention is suitable for Code Division Multiple Access (CDMA), Global System for Mobile Communications (GSM), and so on according to the prior art.

Figure 1:
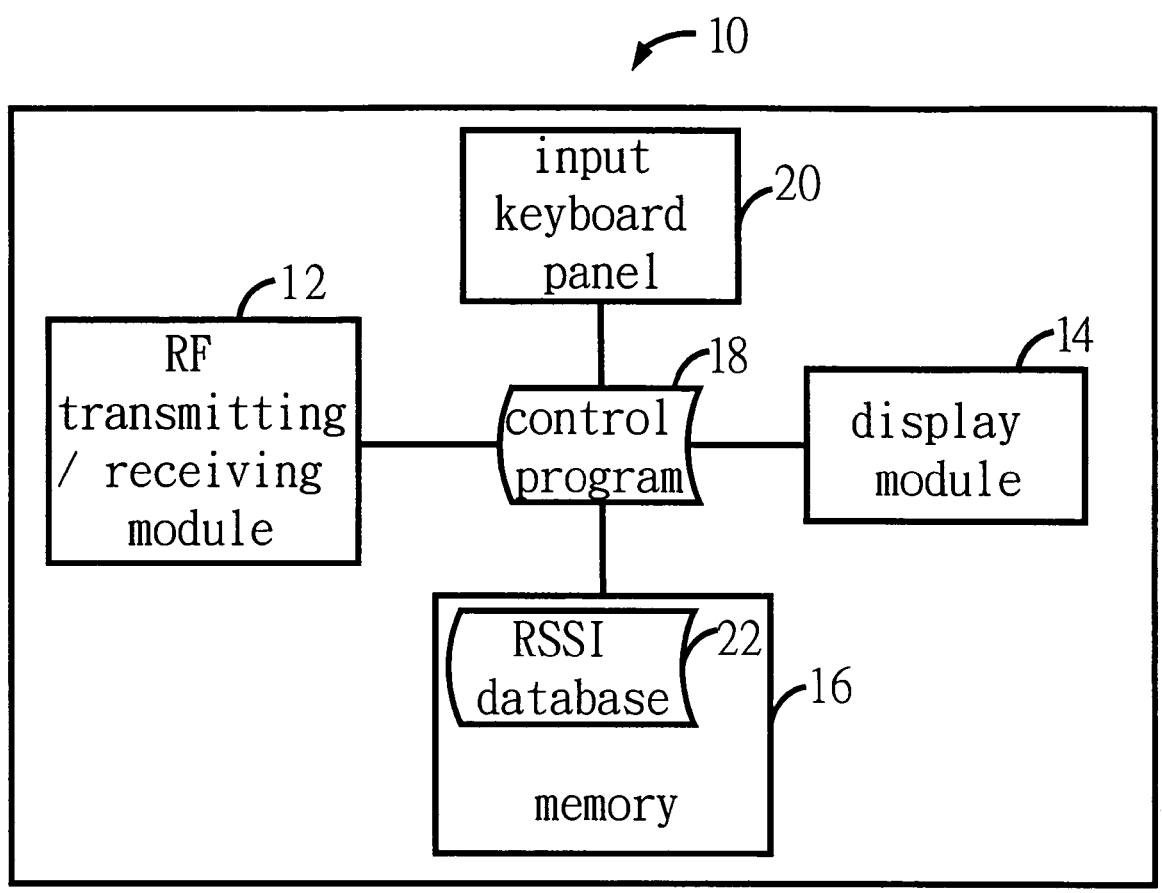
FIG. 1 is a system block diagram of a mobile station apparatus according to the present invention.

Please refer to FIG. 1. FIG. 1 is a system block diagram of a mobile station apparatus 10 according to the present invention. The mobile station apparatus 10 of the present invention comprises an RF transmitting/receiving module 12, a display module 14, a memory 16, a control program 18, and an input keyboard panel 20.

The RF transmitting/receiving module 12 is used for transmitting and receiving RF signals to/from the base stations of a communication system (not shown) and for receiving a received signal strength indicator (RSSI) from the base stations. The display module 14 is used for displaying characters or graphs thereon. The memory 16 comprises an RSSI database 22.

When the mobile station apparatus 10 moves along a path comprising plural candidates of communication locations, the control program 18 records a plurality of RSSIs, which are received by the RF transmitting/receiving module 12 from the candidates along the communication locations, and at least one path parameter in the RSSI database 22. Then, according to a predetermined display algorithm, the control program 18 controls the display module 14 to display at least one recorded RSSI and the corresponding path parameter as a reference, based on which the mobile station apparatus 10 selects a communication location candidate for providing the mobile communication service.

In an embodiment, the path parameter recorded in the RSSI database 22 is a time parameter representing the time when the RF transmitting/receiving module 12 receives the RSSI. In the other embodiment, the path parameter recorded in the RSSI database 22 is a location parameter representing the location where the RF transmitting/receiving module 12 receives the RSSI. The location parameter comprises the location data of altitude, longitude, and/or latitude. In another embodiment, the path parameter recorded in the RSSI database 22 is an output power parameter representing the power consumption information while the RF transmitting/receiving module 12 transmits the RF signal. Moreover, in different embodiments, the path parameters recorded in the RSSI database 22 may be all of the time parameter, the location parameter, and the output power parameter, or two of the three parameters.

According to the above time parameter, location parameter, and output power parameter, the time, the location, and the power consumption of the mobile station apparatus in a path may be obtained respectively. A user may utilize this information to select better communication locations.

When a user uses the mobile station apparatus 10 in a communication system for receiving the mobile communication service within a covered communication area provided by the communication system, the control program 18 automatically compares the currently received RSSI with a predetermined RSSI threshold. Only when the currently received RSSI exceeds the predetermined RSSI threshold, the control program 18 will record the RSSI and the corresponding path parameter in the RSSI database 22, so that the amount of data recorded in the RSSI database 22 is under control to avoid capacity-exceeding.

The predetermined RSSI threshold comprises an RSSI mean value and an RSSI standard deviation. The RSSI mean value is obtained by averaging a plurality of RSSIs received in a past time span, and the RSSI standard deviation is obtained by calculating the standard deviation of a plurality of RSSIs received in the past time span by means of statistics calculation method.

The input keyboard panel 20 of the mobile station apparatus 10 has a plurality of buttons (not shown) for data inputting or selection confirmation by a user. When the user utilizes the input keyboard panel 20 to input a display signal for location candidate, the control program 18 displays at least one RSSI recorded in the RSSI database 22 and the corresponding path parameter according to the predetermined display algorithm.

The predetermined display algorithm accorded by the control program 18 sorts the RSSIs recorded in the RSSI database 22 by signal intensity and displays the sorted RSSIs and the corresponding path parameters in the display module 14, so that the mobile station apparatus 10 selects one appropriate communication location candidate and accordingly conducts the mobile communication service. In this way, the power consumption of the mobile station apparatus 10 is reduced.

In an embodiment, the sorted RSSI and the corresponding path parameter displayed in the display module 14 can be provided for the user as a reference, so that the user can move to one of the communication location candidates for communication. Generally, the user will select the best of the sorted communication location candidates, and at those locations, because of having the best communication quality and the lowest power consumption of the mobile station apparatus, the electric power of the battery will be saved. Moreover, it is also possible for the user to select the next best communication location candidate because the next best communication location candidate is closest to the current location. In general, because the signal is more intense at a better communication location, the power consumption of the mobile station apparatus is lower, and more electric power of the battery is saved.

Before the mobile station apparatus 10 actually provides the mobile communication service at a predetermined location, the RF transmitting/receiving module 12 receives the RSSI from the base station at the predetermined location again for confirmation and compares the received RSSI with the previously corresponding RSSI recorded in the RSSI database 22. When the signal intensity of the received RSSI is substantially close to or greater than the recorded corresponding RSSI, the display module 14 displays suggestion to conduct the mobile communication service at the predetermined location; otherwise, the display module 14 displays the next best communication location candidate recorded in the RSSI database 22 as a further reference for selection.

Figure 2:
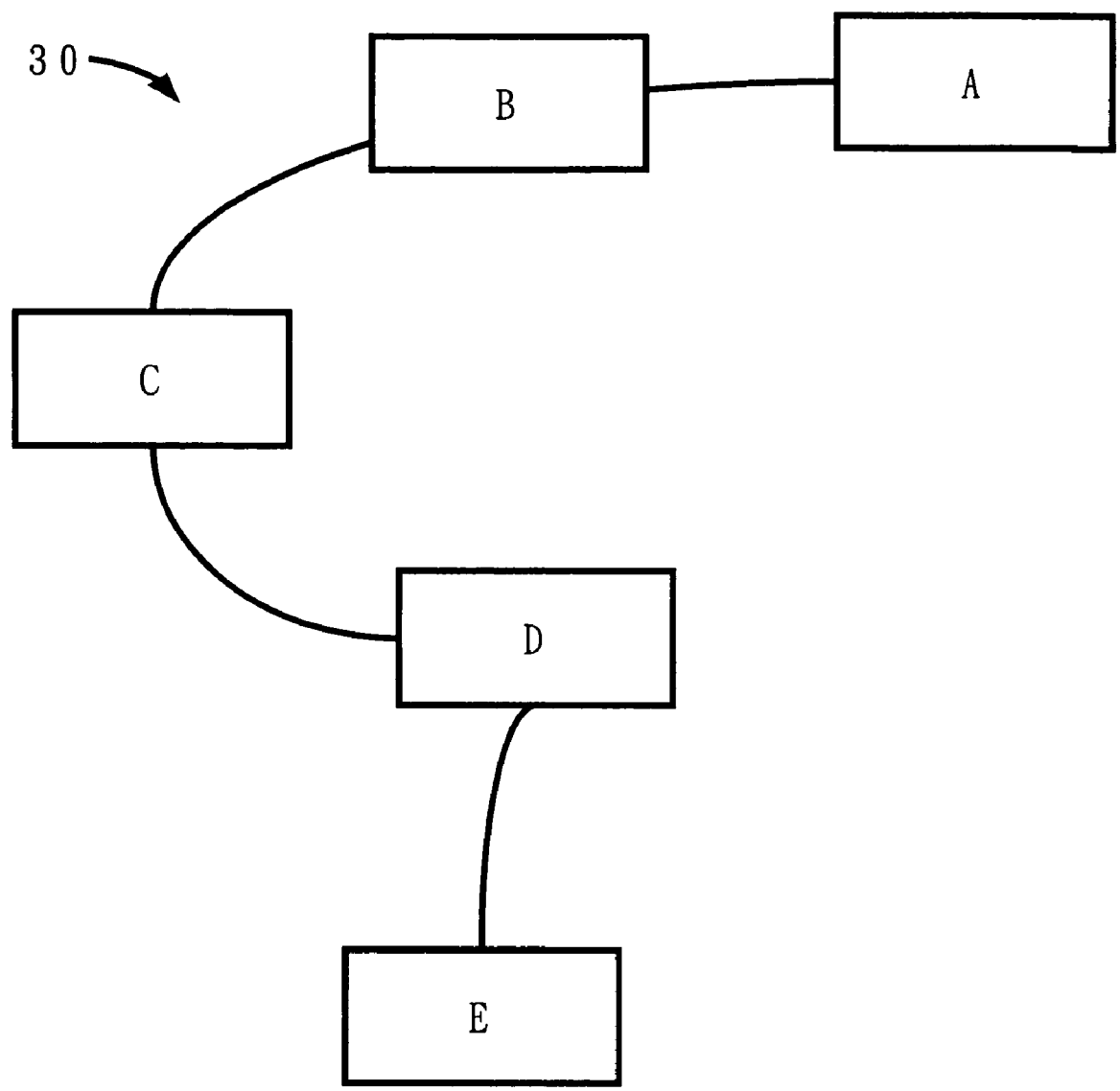
FIG. 2 is a schematic diagram of a mobile station apparatus in FIG. 1 moving along a path.

Please refer to FIG. 1 and FIG. 2. FIG. 2 is a schematic diagram of a mobile station apparatus 10 in FIG. 1 moving along a path 30. As shown in FIG. 2, a user carries the mobile station apparatus 10 and moves along the path 30. When the user moves along the path 30, the control program 18 compares a plurality of RSSIs, which are received by the RF transmitting/receiving module 12 at the locations A, B, C, D, and E respectively, with a predetermined RSSI threshold. When the currently received RSSI exceeds the predetermined RSSI threshold, the control program 18 records the RSSI and the corresponding path parameter in the RSSI database 22. In this embodiment, only the RSSIs received at the locations A, C, D, and E exceed the predetermined RSSI threshold, so the corresponding path parameters and the RSSIs will be recorded.

When the user moves to the location D and inputs a display signal for location candidate, the control program 18 sorts the RSSIs recorded in the RSSI database 22 by signal intensity and displays the sorted RSSIs and the corresponding path parameters in the display module 14. In this embodiment, the intensity of the RSSI at the location C is the most intense among the four locations, the intensity of the RSSI at the location D is next, the following one is at the location E, and the final one is at the location A. Therefore, the location C is the most appropriate communication location when the user moves from location A to location E along the path 30. The relative RSSIs and the path parameters will be displayed on the display module 14 in the order of C, D, E, and A for reference. By utilizing the information displayed by the display module 14, the user may return to the location C for communication to obtain better communication quality. Therefore, the power consumption of the mobile station apparatus 10 is reduced, the electric power of the battery is saved, and the using time of the apparatus is extended.

In an embodiment, the mobile station apparatus 10 further links to a GPS (global positioning system) database (not shown) of the communication area. The predetermined display algorithm accorded by the control program 18 displays a GPS map associated with the communication area in the GPS database, sorts the RSSIs recorded in the RSSI database 22 by signal intensity, and selectively marks the sorted RSSI beside the corresponding location on the displayed GPS map in the display module 14, so that the mobile station apparatus 10 selects the location with the lowest power consumption for conducting the mobile communication service. Please refer to the path 30 in FIG. 2; the display module 14 can display the map comprising the locations A, B, C, D, and E. On this map, the corresponding RSSIs are marked beside the locations C, D, E, and A respectively.

In the mobile station apparatus of the present invention, because the control program utilizes the information of the RSSI to select the communication location and displays a plurality of better communication locations for reference and selection for a user, the user can select better communication locations for conducting the mobile communication service to save power. Therefore, the present invention not only improves the communication quality of the mobile station apparatus but also reduces the power consumption of the battery, so that electric power is saved.

The present invention also provides a method for selecting the communication locations in a mobile station apparatus. The communication system comprises a plurality of base stations for providing mobile communication service within a covered communication area. The method of the present invention for selecting the communication locations will be described in the following by utilizing the mobile station apparatus 10 in FIG. 1. The method of the present invention enables the mobile station apparatus 10 to move along a path comprising plural candidates of communication locations and records a plurality of RSSIs, which are received by the RF transmitting/receiving module 12 from the candidates along the communication locations, and at least one path parameter in the RSSI database 22. Then, the method controls the display module 14 to display at least one recorded RSSI and the corresponding path parameter according to a predetermined display algorithm, based on which a communication location candidate is selected by the mobile station apparatus 10 for providing the mobile communication service.

According to the present invention, the method for selecting the communication locations in a mobile station apparatus is especially suitable for the mobile station apparatus with limited electricity. Selecting better locations for the mobile communication service not only improves the communication quality but also save the electric power in the battery of the mobile station apparatus.

Figure 3:
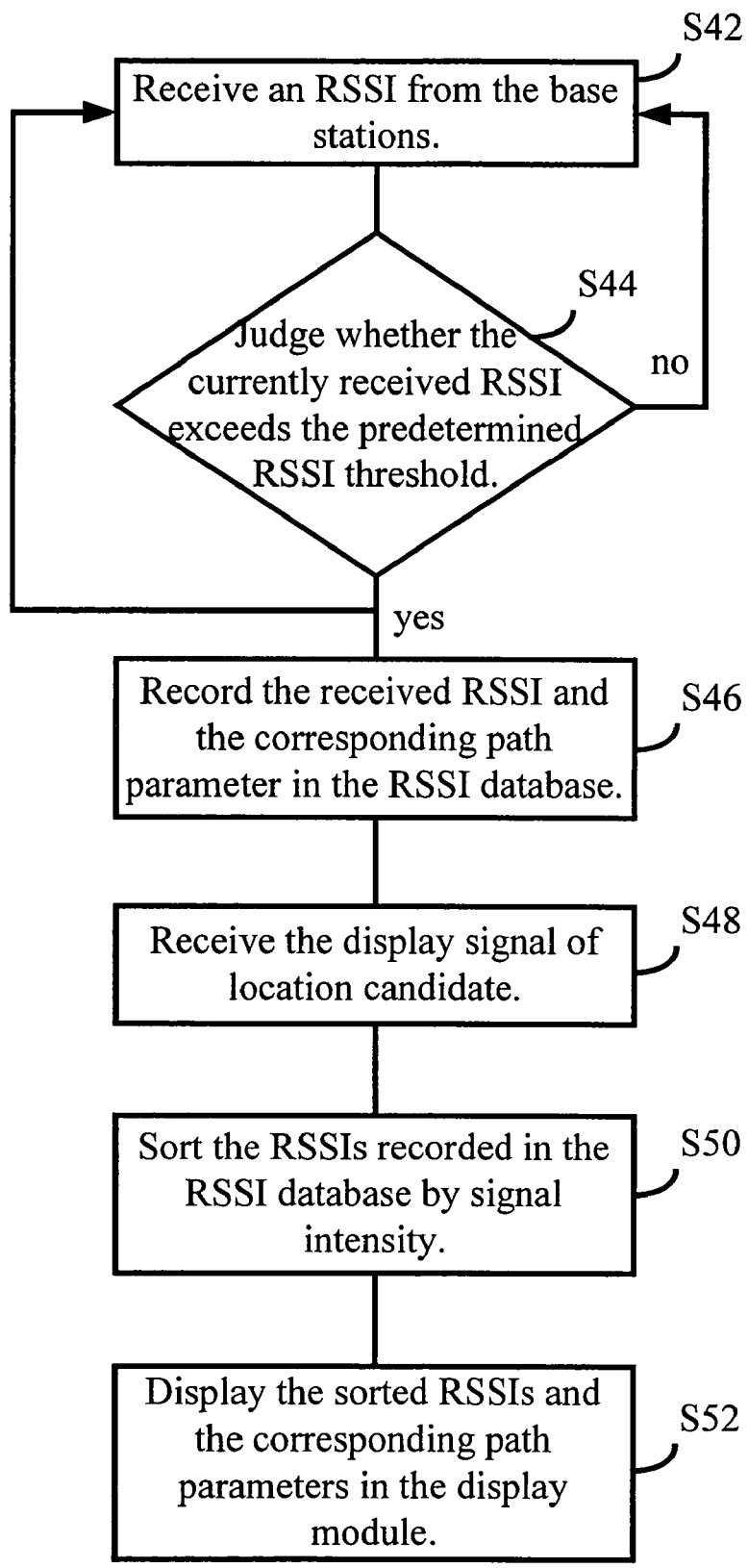
FIG. 3 is a flowchart for processing the signals and parameters in the method of selecting communication locations in the mobile station apparatus.

Please refer to FIG. 3. FIG. 3 is a flowchart for processing the signals and parameters in the method of selecting communication locations in the mobile station apparatus 10. According to the present invention, in the method for selecting communication locations in the mobile station apparatus 10, the mobile station apparatus 10 may be carried by a user while the user is moving around. The mobile station apparatus 10 receives the RSSIs and processes the relative signals and parameters at the same time. When the user utilizes the input keyboard panel 20 of the mobile station apparatus to input a display signal of a location candidate, the mobile station apparatus 10 will display the information for reference. According to the present invention, in the method for selecting the communication locations in the mobile station apparatus 10, the process, in which the mobile station apparatus 10 processes the relative signals and parameters for providing reference, comprises the following steps:

S42: Receive the RSSIs from the base stations.

S44: Judge whether the currently received RSSI exceeds the predetermined RSSI threshold. If yes, go to step S46; otherwise, go to step S42.

S46: Record the received RSSIs and the corresponding path parameters in the RSSI database 22.

S48: Receive the display signal of a location candidate.

S50: Sort the RSSIs recorded in the RSSI database 22 by signal intensity.

S52: Display the sorted RSSIs and the corresponding path parameters in the display module 14.

When the mobile station apparatus 10 moves along a path that comprises a plurality of communication location candidates, the mobile station apparatus 10 will receive the RSSIs continuously. Therefore, the above steps, S42 to S46, are processed continuously. In actual application, the amount of data of the recorded RSSIs and the corresponding path parameters stored are determined by the size of the memory, and the records close to the present location may have a higher priority to be kept.

Figure 4:
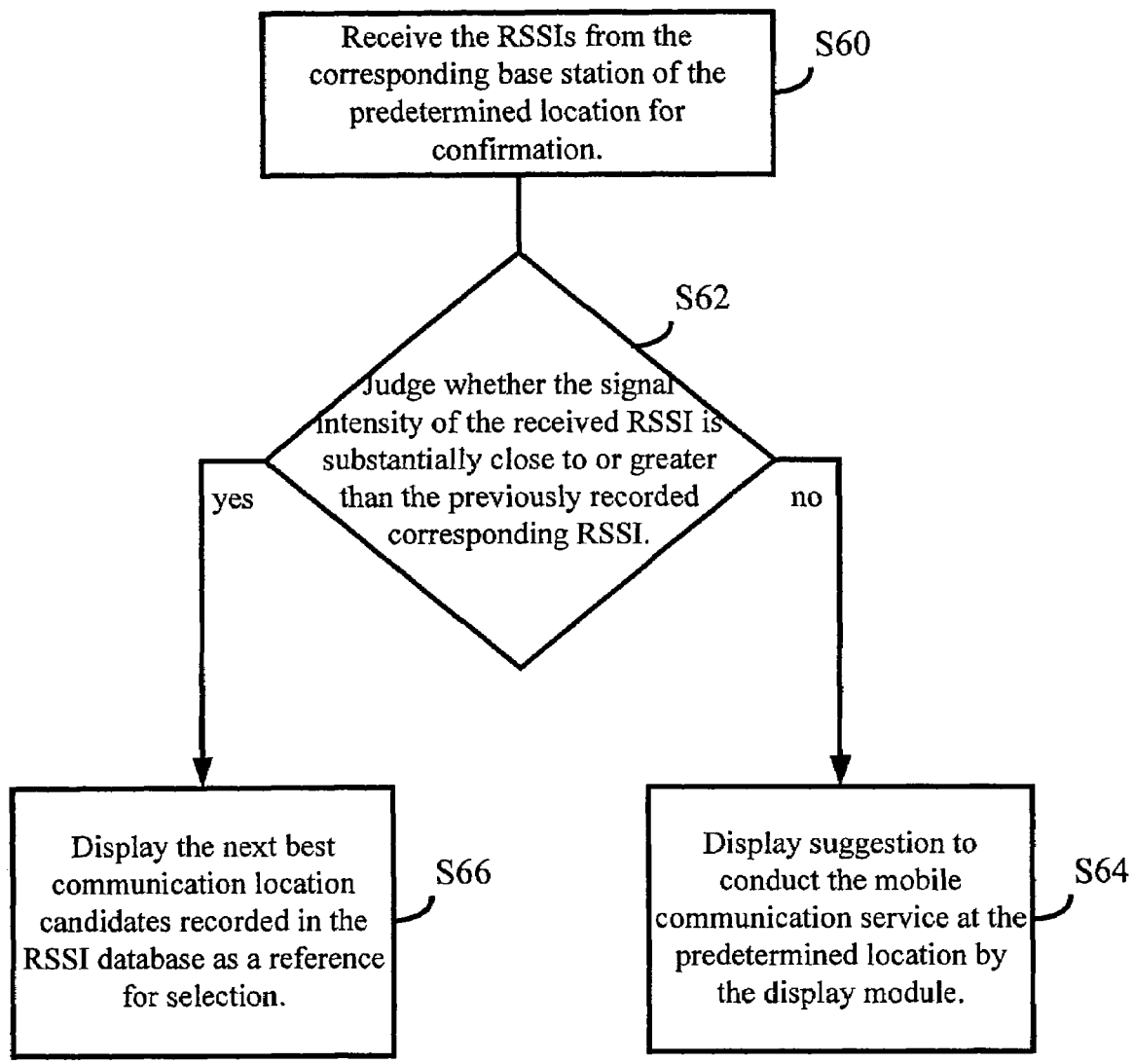
FIG. 4 is a flowchart for processing the signals and parameters in the method of selecting communication locations in the mobile station apparatus before the mobile station apparatus actually provides the mobile communication service at a predetermined location.

Please refer to FIG. 4. FIG. 4 is a flowchart for processing the signals and parameters in the method of selecting communication locations in the mobile station apparatus 10 before the mobile station apparatus 10 actually provides the mobile communication service at a predetermined location. According to the present invention, in the method for selecting the communication locations in the mobile station apparatus 10, the mobile station apparatus 10 will process the following steps after the process shown in FIG. 3 and before actually conducting the mobile communication service at a predetermined location:

S60: Receive the RSSIs from the corresponding base station of the predetermined location for confirmation.

S62: Judge whether the signal intensity of the received RSSI is substantially close to or greater than the previously recorded corresponding RSSI. If yes, go to step S64; otherwise, go to step S66.

S64: Display suggestion to conduct the mobile communication service at the predetermined location by the display module.

S66: Display the next best communication location candidates recorded in the RSSI database 22 as a further reference for selection.

In an embodiment, the mobile station apparatus 10 is a mobile phone, and the path parameter is the location parameter. When a user wants to make a phone call, the battery of the mobile phone is running low, and the user cannot change the battery at the moment, the user can move around and input a display signal of location candidate by the buttons of the mobile phone, so that the mobile phone will display the sorted RSSIs and the corresponding locations for reference. When the user returns to the best location, the mobile phone receives the RSSI again for confirmation and compares the received RSSI with the previous record. If the signal intensity of the received RSSI is substantially close to or greater than the recorded corresponding RSSI, the mobile phone will display a suggestion to conduct the mobile communication service at the location; otherwise, the mobile phone will display the recorded next best communication location candidates as a further reference for selection.

According to the present invention, the mobile station apparatus capable of displaying better communication locations and method thereof can display the RSSIs and the corresponding path parameters for selecting a communication location candidate as a reference to conduct the mobile communication service. Because the present invention can automatically detect and display better communication locations as a reference for selection, the mobile station apparatus of the present invention can base on the reference data to select a better location for providing the mobile communication service. Selecting better locations for providing mobile communication service not only improves the communication quality but also reduces the power consumption of the mobile station apparatus, thus saving electric power in the battery.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A mobile station apparatus in a communication system, the communication system comprising a plurality of base stations for providing mobile communication service within a covered communication area, the mobile station apparatus comprising:
   an RF transmitting/receiving module for transmitting and receiving RF signals to/from the base stations and for receiving a received signal strength indicator (RSSI) from the base stations;
   a display module for displaying characters or graphs thereon;
   a memory comprising an RSSI database; and
   a control program;
   wherein when the mobile station apparatus moves along a path comprising plural candidates of communication locations, the control program records a plurality of RSSIs, which are received by the RF transmitting/receiving module from the candidates along the communication locations, and at least one path parameter in the RSSI database, and then according to a predetermined display algorithm, the control program controls the display module to display at least one recorded RSSI and the corresponding path parameter as a reference, based on which the mobile station apparatus selects a communication location candidate for providing the mobile communication service; and
   wherein before the mobile station apparatus actually provides the mobile communication service at a predetermined location, the RF transmitting/receiving module receives the RSSI from the base station at the predetermined location again for confirmation and compares the received RSSI with the previously corresponding RSSI recorded in the RSSI database, and when the signal intensity of the received RSSI is substantially close to or greater than the recorded corresponding RSSI, the display module displays suggestion to conduct the mobile communication service at the predetermined location, otherwise the display module displays the next best communication location candidates recorded in the RSSI database as a further reference for selection.

2. The mobile station apparatus of claim 1, wherein the path parameter recorded in the RSSI database is a time parameter representing the time when the RF transmitting/receiving module receives the RSSI.

3. The mobile station apparatus of claim 1, wherein the path parameter recorded in the RSSI database is a location parameter representing the location where the RF transmitting/receiving module receives the RSSI.

4. The mobile station apparatus of claim 3, wherein the location parameter comprises the location data of altitude, longitude, and/or latitude.

5. The mobile station apparatus of claim 1, wherein the path parameter recorded in the RSSI database is an output power parameter representing the power consumption information while the RF transmitting/receiving module transmits the RF signal.

6. The mobile station apparatus of claim 1, wherein when a user is situated in the communication area, the control program automatically compares the currently received RSSI with a predetermined RSSI threshold, and only when the currently received RSSI exceeds the predetermined RSSI threshold, then the control program records the RSSI and the corresponding path parameter in the RSSI database, so that the amount of data recorded in the RSSI database is under control to avoid capacity-exceeding.

7. The mobile station apparatus of claim 6, wherein the predetermined RSSI threshold comprises an RSSI mean value and an RSSI standard deviation, the RSSI mean value is obtained by averaging a plurality of RSSIs received in a past time span, and the RSSI standard deviation is obtained by calculating the standard deviation of a plurality of RSSIs received in the past time span by means of statistics calculation method.

8. The mobile station apparatus of claim 1, wherein the mobile station apparatus further comprises an input keyboard panel with a plurality of buttons for data inputting or selection confirmation by a user, and when the user utilizes the input keyboard panel to input a display signal for location candidate, the control program displays at least one RSSI recorded in the RSSI database and the corresponding path parameter according to the predetermined display algorithm.

9. The mobile station apparatus of claim 1, wherein the predetermined display algorithm accorded by the control program sorts the RSSIs recorded in the RSSI database by signal intensity and displays the sorted RSSIs and the corresponding path parameters in the display module, so that the mobile station apparatus selects one appropriate communication location candidate and accordingly conducts the mobile communication service, so that the power consumption of the mobile station apparatus is reduced.

10. The mobile station apparatus of claim 1, wherein the mobile station apparatus links to a GPS (global positioning system) database of the communication area, and the predetermined display algorithm displays a GPS map associated with the communication area in the GPS database, sorts the RSSIs recorded in the RSSI database by signal intensity, and selectively marks the sorted RSSI beside the corresponding location on the displayed GPS map in the display module, so that the mobile station apparatus selects the location with the lowest power consumption for conducting the mobile communication service.

11. A method for selecting communication location for a mobile station apparatus, the mobile station apparatus in a communication system, the communication system comprising a plurality of base stations for providing mobile communication service within a covered communication area, the mobile station apparatus comprising:
  an RF transmitting/receiving module for transmitting and receiving RF signals to/from the base stations and for receiving a received signal strength indicator (RSSI) from the base stations;
  a display module for displaying characters or graphs thereon; and
  a memory comprising an RSSI database;
  the method comprising the following steps:
  enabling the mobile station apparatus to move along a path comprising plural candidates of communication locations;
  recording in the RSSI database a plurality of RSSIs, which are received by the RF transmitting/receiving module from the candidates along the communication locations, and at least one path parameter;
  controlling the display module to display at least one recorded RSSI and the corresponding path parameter according to a predetermined display algorithm; and
  based on which selecting a communication location candidate by the mobile station apparatus for providing the mobile communication service;
  wherein before the mobile station apparatus actually provides the mobile communication service at a predetermined location, the RF transmitting/receiving module receives the RSSI from the base station at the predetermined location again for confirmation and compares the received RSSI with the previously corresponding RSSI recorded in the RSSI database, and when the signal intensity of the received RSSI is substantially close to or greater than the recorded corresponding RSSI, the display module displays suggestion to conduct the mobile communication service at the predetermined location, otherwise the display module displays the next best communication location candidates recorded in the RSSI database as a further reference for selection.

12. The method of claim 11, wherein the path parameter recorded in the RSSI database is a time parameter representing the time when the RF transmitting/receiving module receives the RSSI.

13. The method of claim 11, wherein the path parameter recorded in the RSSI database is a location parameter representing the location where the RF transmitting/receiving module receives the RSSI.

14. The method of claim 13, wherein the location parameter comprises the location data of altitude, longitude, and/or latitude.

15. The method of claim 11, wherein the path parameter recorded in the RSSI database is an output power parameter representing the power consumption information while the RF transmitting/receiving module transmits the RF signal.

16. The method of claim 11, wherein when a user is situated in the communication area, the control program automatically compares the currently received RSSI with a predetermined RSSI threshold, and only when the currently received RSSI exceeds the predetermined RSSI threshold, then the control program records the RSSI and the corresponding path parameter in the RSSI database, so that the amount of data recorded in the RSSI database is under control to avoid capacity-exceeding.

17. The method of claim 16, wherein the predetermined RSSI threshold comprises an RSSI mean value and an RSSI standard deviation, the RSSI mean value is obtained by averaging a plurality of RSSIs received in a past time span, and the RSSI standard deviation is obtained by calculating the standard deviation of a plurality of RSSIs received in the past time span by means of statistics calculation method.

18. The method of claim 11, wherein the mobile station apparatus further comprises an input keyboard panel with a plurality of buttons for data inputting or selection confirmation by a user, and when the user utilizes the input keyboard panel to input a display signal for location candidate, the control program displays at least one RSSI recorded in the RSSI database and the corresponding path parameter according to the predetermined display algorithm.

19. The method of claim 11, wherein the predetermined display algorithm accorded by the control program sorts the RSSIs recorded in the RSSI database by signal intensity and displays the sorted RSSIs and the corresponding path parameters in the display module, so that the mobile station apparatus selects one appropriate communication location candidate and accordingly conducts the mobile communication service, so that the power consumption of the mobile station apparatus is reduced.

20. The method of claim 11, wherein the mobile station apparatus links to a GPS (global positioning system) database of the communication area, and the predetermined display algorithm displays a GPS map associated with the communication area in the GPS database, sorts the RSSIs recorded in the RSSI database by signal intensity, and selectively marks the sorted RSSI beside the corresponding location on the displayed GPS map in the display module, so that the mobile station apparatus selects the location with the lowest power consumption for conducting the mobile communication service.

21. A method for determining a better communication location for a mobile station communicated with a base station, the mobile station comprising:
  a RF receiving module for receiving a RF signal and a received signal strength indicator (RSSI) from the base station;
  a display module; and
  a memory storing a RSSI database;
  the method comprising the steps of:
  the mobile station moving along a path including a plurality of candidate communication locations;
  the mobile station recording in the RSSI database a location information and a first RSSI received by the RF receiving module when the mobile station is located at each of the candidate communication locations;
  before the mobile station provides a communication service at a selected location, the RF receiving module receives a second RSSI from the base station at the selected location;
  based on the location information, comparing the second RSSI with the first RSSI recorded in the RSSI database corresponding to the selected location; and
  when the second RSSI is substantially equal to or greater than the first RSSI, the mobile station conducts the communication service at the selected location.

22. The method of claim 21, further comprising the step of:
  when the second RSSI is substantially lower than the first RSSI, the display module displays the next best candidate communication location recorded in the RSSI database as a further reference for selection.

* * * * *